July 18, 1967 W. H. SCHNACKE 3,331,264
SAW TOOTH RECONDITIONER AND SHARPENER
Filed July 30, 1965
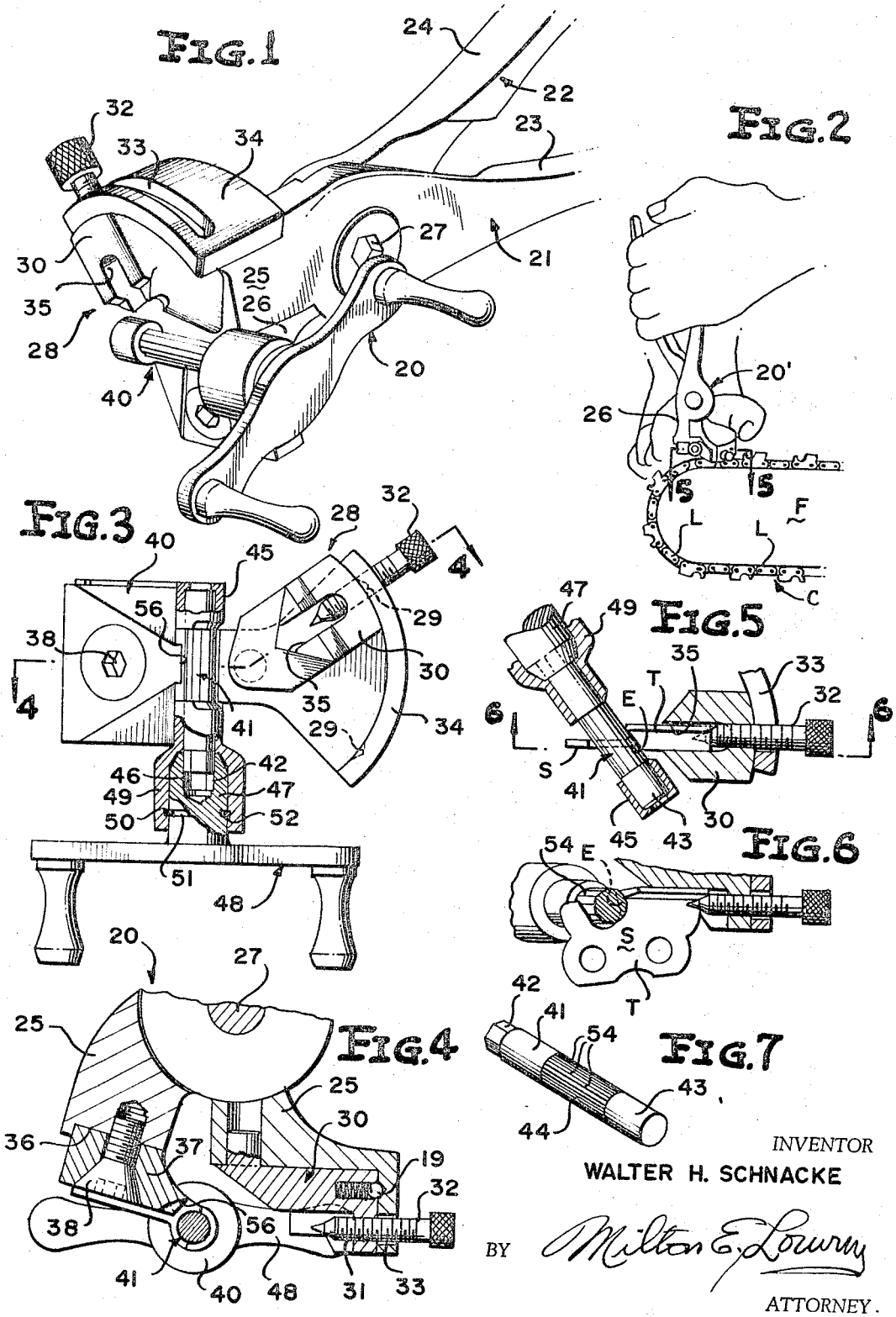
INVENTOR
WALTER H. SCHNACKE
BY Milton E. Lowry
ATTORNEY.

United States Patent Office 3,331,264
Patented July 18, 1967

3,331,264
SAW TOOTH RECONDITIONER AND
SHARPENER
Walter H. Schnacke, R.R. 4, Box 114-A,
Evansville, Ind. 47712
Filed July 30, 1965, Ser. No. 475,965
12 Claims. (Cl. 76—89.2)

ABSTRACT OF THE DISCLOSURE

A device for reconditioning saw teeth by means for deforming the cutting edge of a saw without removal of metal resulting in the sharpening of the saw teeth.

---

This invention relates to a novel device for "sharpening" the teeth of a powered chainsaw, and is particularly directed to a device which reconditions and "sharpens" the cutting edges of chainsaw teeth without removing metal therefrom by the cold-forming, deforming or cold-working of the metallic cutting edges.

Heretofore it has been common to sharpen the cutting edges of chainsaw teeth by bringing the cutting edges into contact with a rotating abrasive portion of a conventional sharpening implement. The abrasive portion of such conventional sharpening implements is generally manually rotated and each tooth is sharpened by removing a predetermined amount of metal from the cutting edge thereof.

Such conventional sharpening implements or devices are highly inefficient and possess many inherent disadvantages as compared to the novel device of this invention, as will appear more fully hereinafter. Among the most salient disadvantages of these conventional devices are the following:

The teeth of conventional chainsaws are relatively small and the cutting edges thereof present a limited amount of metal which can be removed without materially reducing the strength of the teeth or limiting the number of times such teeth can be sharpened in the conventional manner in which appreciable metal is "ground" away. Therefore, any device, and the device of this invention in particular, which "sharpens" the cutting edge of teeth by cold-forming or cold-flowing the metal, i.e., without removing metal, insures increased tooth life and permits an appreciably greater number of "sharpenings" without decreasing tooth strength as compared to conventional metal-removing sharpening devices. Tooth breakdowns are, therefore, less numerous and greater efficiency from any one particular chainsaw blade is obtained.

Conventional chainsaw teeth also have a predetermined "set" i.e., the angle of the cutting edge relative to the tooth body or shank. When conventional sharpening devices are used to sharpen the cutting edges the removal of metal constitutes a removal of the tooth "set." Each tooth of a chainsaw thus sharpened varies in its set from the remaining teeth causing erratic operation of the chainsaw and unpredictable varied cuts.

The conventional teeth of a powered saw are also quite hard and the cutting edge is relatively small. This necessitates the use of small diameter abrasive or grinding tools in conventional sharpening implements to properly fit the cutting edge of the teeth. Because the grinding tool or grinding wheel is of a small diameter the grinding or abrasive surface is worn out after only a few sharpening operations have been performed. Furthermore, the slippage of the grinding wheel over the hard cutting edge of the teeth causes the grinding surface to dull even more rapidly.

It is a primary object of this invention, therefore, to provide a novel chainsaw tooth "sharpener" which eliminates the above-mentioned and other disadvantages inherent in conventional devices by "reconditioning" tooth cutting edges by a cold-forming or cold-flowing operation by which the cutting edges are sharpened in the accepted sense of this term but such sharpening takes place in the absence of the actual removal of metal by conventional grinding, abrading or analogous metal-removing operations.

A further object of this invention is to provide a novel sharpening device having an anvil provided with means for locating a chainsaw tooth relative to means for cold-forming the cutting edge of the tooth without removing metal therefrom, and the cold-forming means being a rotatable element having a hard smooth surface opposing the locating means for bearing against and deforming the cutting edge upon the rotation of the element.

Still another object of this invention is to provide a novel sharpening device of the type immediately above described which includes means for adjusting the locating means at a predetermined angle relative to the element surface whereby the particular set of the cutting edge of a tooth is accurately established or retained during a sharpening operation.

A further object of this invention is to provide a novel sharpening device including a pair of arms arranged in a pliers-like fashion, one of the arms including an anvil, the other of the arms including means for cold-forming the cutting edge of a chainsaw tooth without removing metal therefrom, the anvil including a body having a slot for positioning a tooth relative to the cold-forming means, adjusting means for varying the angular position of a tooth in said slot relative to said cold-forming means, and the cold-forming means being a manually rotatable element having a hard smooth cam surface opposing the slot for progressively bearing against and cold-flowing the metal of a cutting tooth in the slot upon the rotation of the element.

The above and other objects and advantages will be more apparent and the invention will be more fully understood from the following description of a preferred embodiment illustrated in the accompanying drawing.

In the drawing:

FIG. 1 is a fragmentary perspective view of a novel chain saw tooth reconditioner or sharpener constructed in accordance with this invention, and illustrates the general pliers-like arrangement of a pair of arms carrying opposed anvil and cold-forming means;

FIG. 2 is a reduced perspective view of the device of FIG. 1, and illustrates the position of the device relative to a cutting tooth of a chainsaw during a sharpening operation;

FIG. 3 is a fragmentary top plan view of the device of FIG. 2, and more clearly illustrates the anvil and cold-forming means, means for adjusting the anvil means relative to the cold-forming means, and means for rotating the cold-forming means;

FIG. 4 is a fragmentary sectional view taken generally along line 4—4 of FIG. 3, and clearly illustrates a portion of the cold-forming means which includes a hardened flat-faced surface of a rotatable element opposing a locating slot of the anvil means;

FIG. 5 is an enlarged sectional view of a portion of the device taken along line 5—5 of FIG. 2, and illustrates the flat-faced surface of the cold-forming means in contact with the cutting edge of the cutting tooth;

FIG. 6 is an enlarged sectional view taken generally along line 6—6 of FIG. 5, and more clearly illustrates the configuration of the cutting tooth and the position thereof relative to the cold-forming means during a sharpening operation; and FIG. 7 is a perspective view of the rotatable element, and more clearly illustrates the flat faces thereof.

A novel reconditioning or sharpening device is shown in the drawing and is generally referred to by the reference numeral 20. The device 20 is particularly constructed to sharpen the teeth of a powered chainsaw (not shown) having a blade formed of a frame F (FIG. 4) about which is guidably driven a chain C formed of a plurality of interconnected links L. A plurality of identical cutting teeth are carried by the chain C and one of the teeth T is best illustrated in FIGS. 5 and 6 of the drawing.

The tooth T, as well as the remaining unnumbered teeth, includes a body or shank S (FIG. 6) which is generally of an inverted L-shaped configuration. The shank S is constructed of relatively hard metallic material, such as steel, and terminates in a cutting edge E which is for a predetermined set, i.e., the angle of the cutting edge E relative to the shank S.

The sharpening device 20 comprises a pair of arms 21, 22 having respectively first end portions 23–24 and second end portions 25, 26. The arms 21, 22 are pivoted together between the end portions 23–24 and 25–26 by a screw 27 passed through an opening (not shown) in the arm 22 and received in a threaded bore (also not shown) in the arm 21. This construction imparts a generally pliers-like arrangement to the device 20 whereby opening and closing of the second end portions 25–26 is effected by manually spreading and closing respectively of the first end portions 23, 24.

The second end portion 25 of the arm 21 carries anvil means or an anvil 28 comprising a body 30 having a threaded bore 31. The anvil 28 is mounted for adjusting movement on the second end portion 25 by means of threaded stud or screw 32 passed through an elongated slot 33 in an upstanding portion 34 of the end portion 25. The stud 32 is threaded in the bore 31 of the anvil body 30, as is best illustrated in FIGS. 4–6 of the drawings. In order to accurately position the anvil body 30 at each end of the slot 33 a spring-biased ball 19 (FIG. 4) partially housed in a bore (unnumbered) is received in either one or two identical recesses 29, 29 (FIG. 3) in the upstanding portion 34 of the body 30 adjacent opposite ends of the slot 33, as is clearly shown in FIG. 4 of the drawing.

The purpose of providing adjustment of the anvil body 30 is to positively align the cutting edge E of any one of the teeth T to retain or reestablish the tooth set. Locating means in the form of a locating slot 35 formed in the anvil body 30 confiningly receives and locates each of the teeth T during a sharpening operation, as will appear more fully hereafter.

The second end portion 26 of the arm 22 terminates in a flattened head 36 carrying a removable body 37. The removable body 37 is secured to the head 36 by means of a stud 38 in the manner clearly illustrated in FIG. 4 of the drawing.

The body 37 carries means 40 for cold-forming the cutting edges E of the teeth T. The cold-forming means 40 includes an elongated element 41 (FIG. 4) having spaced end portions 42–43 and a medial portion 44. The end portion 43 of the element 41 is rotatably mounted in a journal 45 of the removable body 37. The polygonal end portion 42 of the element 41 is received in a complementary configured socket 46 of a stem 47 of handle 48. The stem 47 is cylindrical in configuration and is rotatably journaled in a journal 49 of the removable body 37. The handle 48 is prevented from being accidentally axially withdrawn from the socket 47 by means of a split ring 50 housed in opposed annular grooves 51, 52 formed in the socket 46 and stem 47, respectively. The split ring 50 and grooves 51, 52 retain the elements 41, 47 in the operative position illustrated in FIG. 3. However, an axial pull applied to the handle 47 causes the split ring 50 to contract whereupon the handle 47 can be removed from the socket 46, along with the removal of the element 41. This construction permits the rapid withdrawal of the element 41 and the replacement thereof by other elements having identical medial portions 44, or, as will appear hereafter, elements of varied medial portion configurations.

The medial portion 44 of the cold-forming means 40 is in opposed relationship to the locating slot 35 of the anvil body 30 in any one of the preselected positions thereof. The medial portion 44 includes a plurality of flat faces or surfaces 54 which are hard, smooth and devoid of any type of abrasive means, grinding means, or the conventional similar means which removes metal during conventional-type sharpening operations.

A sharpening or reconditioning operation is performed by the device 20 by positioning a tooth, such as the tooth T of FIGS. 4–6, in the locating slot 35 of the anvil body 30 after first adjusting the latter by means of one of the recesses 29 and the ball 19 to position the cutting edge E at a predetermined angle relative to the longitudinal axis of the cold-forming element 41. The screw 32 is tightened to lock tooth T in position and, as is best illustrated in FIGS. 5 and 6, maintain the tooth T accurately positioned in a space between the slot 35 and the pointed end portion of the screw 32. The first end portions 23, 24 of the respective arms 21, 22 are manually squeezed to clamp or grip the tooth T between the second end portions 25, 26. At this time the low side of the cam surface 54 is in contact with the cutting edge E of the tooth T, and the shank S of the tooth contacts a shoulder 56 (FIG. 4) of the body 30. With manual pressure still being exerted upon the tooth T by the squeezing of the arms 21, 22, as shown in FIG. 2, the handle 48 is grasped and rotated to rotate the element 41 and the medial portion 44. The rotation of the element 41 causes the flat faces 54 of the element 41 to successively bear against the cutting edge E of the tooth T with a sufficient force causing the metal of the edge E to be cold-formed or cold-flowed in the manner shown in FIGS. 5–6 of the drawing to sharpen the edge E of the tooth T. This sharpening does not remove the metal of the edge E but merely deforms the same by a cold-flow of the metallic material while imparting the preselected "set" to the cutting edge E as determined by the angular relationship between the locating slot 35 and the axis of the element 41. A single rotation of the handle 48 is generally sufficient to achieve complete sharpening of the tooth, but several rotations (two to eight) may be necessary in the case of extreme tooth wear and/or damage. After the tooth T has been sharpened the arms 21, 22 are released, the device 20 removed from the tooth T, and repositioned on successive ones of the remaining teeth followed by a repetition of the operation above described to completely recondition or sharpen the remaining teeth.

While a preferred embodiment of the invention has been described, variations thereof will be apparent to those skilled in the art after reviewing this disclosure. For example, in lieu of the flat faces 54 of the element 41 the medial portion 44 could be cylindrical in form or provided with abrasive means as, for example, file teeth. This construction is not, however, desirable since it merely achieves metal removal and the attendant disadvantages heretofore noted in conventional prior art devices. However, in cases of extreme tooth wear such abrasive-type elements can be readily substituted for the element 41 by the axial withdrawal and replacement of the handle 48 in the manner heretofore described.

Other changes in the described device as well as in the components thereof will be apparent to those skilled in the art, and the same form a part of this invention and are intended to be embraced by the appended claims.

What is claimed as new is:

1. A device for sharpening a chainsaw tooth having a metallic cutting edge comprising means for gripping a chainsaw tooth, said gripping means including a pair of clamping jaws between which a chainsaw tooth is adapted to be clamped, one of said clamping jaws including means, for locating a chainsaw tooth with respect to the other of said clamping jaws, the other of said clamping jaws including means for cold-forming the metal of the cutting edge without removing metal thereby sharpening the cutting edge, and said cold-forming means being a rotatably mounted flat-faced hard element which bears against and deforms the cutting edge during the rotation thereof causing cold-forming sharpening of said cutting edge.

2. The sharpening device as defined in claim 1 including means for adjusting said locating means in a plurality of positions relative to said element, and means for securing said adjusting means in any one of the plurality of positions thereof.

3. The sharpening device as defined in claim 1 including means for rapidly removing the element from journal means forming a portion of said cold-forming means.

4. The sharpening device as defined in claim 1 including means for adjusting said locating means in a plurality of positions relative to said element, means for securing said adjusting means in any one of the plurality of positions thereof, journal means for rotatably journaling said element, handle means received in said journal means, means interconnecting the element and the handle means, and split ring and groove means interconnecting the handle means and the journal means.

5. The sharpening device as defined in claim 3 wherein the handle means and the element include complementary polygonal interengageable portions whereby the element is rotated upon the rotation of said handle means.

6. A device for sharpening a chainsaw tooth having a metallic cutting edge of a predetermined set comprising means for gripping a chainsaw tooth, said gripping means including a pair of arms having first and second end portions, means pivotally connecting said arms between the first and second end portions thereof, a pair of clamping jaws carried by said second end portions between which a chainsaw tooth is adapted to be clamped, one of said clamping jaws including means for locating a chainsaw tooth at a predetermined angle relative to the other of said clamping jaws, the other of said clamping jaws including means for cold-forming the metal of the cutting edge without removing metal thereby sharpening the cutting edge, and said cold-forming means being a rotatably mounted element having a multiple flat-faced surface adjacent said locating means which bears against and deforms the cutting edge upon the rotation of said element.

7. A device for sharpening a chainsaw tooth having a metallic cutting edge of a predetermined set comprising a pair of arms having first and second end portions, means pivotally connecting said arms between the first and second end portions thereof, an anvil carried by one of said second end portions, said anvil including means for locating a chainsaw tooth at a predetermined angle relative to the other of said second end portions, the other of said second end portions including means for cold-forming the metal of the cutting edge without removing metal thereby sharpening the cutting edge, and said cold-forming means being a rotatably mounted element having a multiple flat-faced surface adjacent said locating means which bears against and deforms the cutting edge of a chainsaw tooth positioned between said second end portions upon the rotation of said element.

8. The sharpening device as defined in claim 7 wherein a handle is provided for rotating said element, and said handle and element include complementary interengaged polygonally contoured portions.

9. The sharpening device as defined in claim 7 wherein said element is elongated and includes a longitudinal axis, and said longitudinal axis and locating means set off an angle of no greater than 180 degrees.

10. A device for sharpening a chainsaw tooth having a metallic cutting edge of a predetermined set comprising a pair of arms having first and second end portions, means pivotally connecting said arms between the first and second end portions thereof, an anvil carried by one of said second end portions, means for cold-forming the metal of the cutting edge without removing metal thereby sharpening the cutting edge, means for rotatably journaling said cold-forming means on the other of said second end portions, said anvil including means for locating a chainsaw tooth at a predetermined angle relative to said cold-forming means, said locating means including a body, means for adjustably securing said body in a plurality of positions relative to said cold-forming means, a slot in said body for confiningly receiving and locating a chainsaw tooth, said cold-forming means being an elongated element, and said element having a hard non-abrasive surface opposing said slot for progressively bearing against and deforming the cutting edge of a chain tooth upon the rotation of said element.

11. The sharpening device as defined in claim 10 wherein said element includes a handle remote from said surface for manually rotating said element during a cold-forming sharpening operation.

12. A device for sharpening a chainsaw tooth having a metallic cutting edge of a predetermined set comprising a pair of arms having first and second end portions, means pivotally connecting said arms between the first and second end portions thereof to form a generally pliers-like arrangement, said first end portions being adapted for manual movement toward and away from each other to move said second end portion toward and away from each other respectively, an anvil carried by one of said second end portions, means for cold-forming and flowing the metal of a cutting edge without removing metal therefrom whereby the cutting edge is sharpened, means for rotatably journaling said cold-forming means on the other of said second end portions, said anvil including means for locating a chainsaw tooth at a selected angle relative to said cold-forming means, said locating means including a body, means for adjustably securing said body in a plurality of positions relative to said cold-forming means, said adjusting means being in the form of a slot in said anvil and a screw passed through said slot and threaded in said body, a locating slot in said body for confiningly receiving and locating a chainsaw tooth, said cold-forming means being an elongated element, and said elongated element having a non-abrasive surface opposing said locating slot for progressively bearing against and deforming the cutting edge of a chainsaw tooth upon the rotation of said element.

References Cited

UNITED STATES PATENTS 1,657,735   1/1928   Armstrong _____ 76—54

GRANVILLE Y. CUSTER, JR., *Primary Examiner.*